(12) United States Patent
Kabune et al.

(10) Patent No.: US 7,305,587 B2
(45) Date of Patent: Dec. 4, 2007

(54) ELECTRONIC CONTROL UNIT FOR MONITORING A MICROCOMPUTER

(75) Inventors: Hideki Kabune, Chiryu (JP); Hiromi Maehata, Chiryu (JP)

(73) Assignees: DENSO CORPORATION, Kariya (JP); Advics Co., Ltd., Aichi-pref. (JP)

( * ) Notice: Subject to any disclaimer, the term of this patent is extended or adjusted under 35 U.S.C. 154(b) by 496 days.

(21) Appl. No.: 10/784,198

(22) Filed: Feb. 24, 2004

(65) Prior Publication Data

US 2004/0172580 A1 Sep. 2, 2004

(30) Foreign Application Priority Data

Feb. 27, 2003 (JP) ............................. 2003-051075

(51) Int. Cl.
*G06F 11/00* (2006.01)
(52) U.S. Cl. .......................................... 714/30; 701/29
(58) Field of Classification Search ................. 714/31, 714/30; 701/29
See application file for complete search history.

(56) References Cited

U.S. PATENT DOCUMENTS

| | | | | |
|---|---|---|---|---|
| 5,493,495 A | * | 2/1996 | Naito et al. .................... | 701/76 |
| 5,526,264 A | * | 6/1996 | Niggemann et al. .......... | 701/76 |
| 5,588,720 A | * | 12/1996 | Mattern .................. | 303/122.08 |
| 5,735,583 A | * | 4/1998 | Katayama et al. ..... | 303/122.05 |
| 5,850,514 A | * | 12/1998 | Gonda et al. .................. | 714/55 |
| 5,966,305 A | | 10/1999 | Watari et al. | |
| 5,980,081 A | | 11/1999 | Watari et al. | |
| 6,012,156 A | * | 1/2000 | Zydek et al. ................ | 714/736 |
| 6,067,586 A | * | 5/2000 | Ziegler et al. ................. | 710/18 |
| 6,243,629 B1 | * | 6/2001 | Sugimoto et al. ............. | 701/29 |
| 6,366,839 B1 | * | 4/2002 | Sato ............................ | 701/29 |
| 6,647,334 B2 | * | 11/2003 | Kizaki ......................... | 701/71 |
| 6,654,680 B2 | | 11/2003 | Shimada et al. | |
| 6,820,220 B1 | * | 11/2004 | Dominke et al. ............. | 714/30 |
| 6,832,337 B2 | * | 12/2004 | Kidokoro et al. ............. | 714/30 |

FOREIGN PATENT DOCUMENTS

JP A-62-108339 5/1987

(Continued)

OTHER PUBLICATIONS

English translation of Notification of Reasons for Refusal from JPO for patent application No. JP-A-2003-051075.

*Primary Examiner*—Robert Beausoliel
*Assistant Examiner*—Philip Guyton
(74) *Attorney, Agent, or Firm*—Posz Law Group, PLC (57) ABSTRACT

An ECU (100, 200) includes a monitoring circuit (2) having a counter (3) for selecting an assignment number (21) of an assignment signal (20), a serial communicating unit (4) for transmitting the assignment signal (20) of the assignment number (21) selected by the counter (3) and to and receiving an answer signal from a microcomputer (1). The ECU also includes a comparing/judging circuit (5) for comparing an answer number (11) with a correct answer number (30) and incrementing the assignment number (21) of the assignment signal selected by the counter (3) by one when both the answers match. This circuit (5) maintains the same assignment number (21) when the answers do not match. The microcomputer (1) performs the operation in conformity with the assignment number (21) of the assignment signal (20) received and transmits the operation result by using an answer signal (10).

18 Claims, 5 Drawing Sheets

FOREIGN PATENT DOCUMENTS

| | | |
|---|---|---|
| JP | A-63-253401 | 10/1988 |
| JP | A-1-177645 | 7/1989 |
| JP | A-1-310422 | 12/1989 |
| JP | A-2-250124 | 10/1990 |
| JP | A-2-292639 | 12/1990 |
| JP | A-4-302343 | 10/1992 |
| JP | U-5-36544 | 5/1993 |
| JP | A-5-143377 | 6/1993 |
| JP | U-5-61769 | 8/1993 |
| JP | A-5-257753 | 10/1993 |
| JP | A-7-200363 | 8/1995 |
| JP | A-8-202589 | 8/1996 |
| JP | A-8-328885 | 12/1996 |
| JP | A-11-259340 | 9/1999 |
| JP | A-2001-350735 | 12/2001 |

* cited by examiner

FIG. 5

ELECTRONIC CONTROL UNIT FOR MONITORING A MICROCOMPUTER

CROSS REFERENCE TO RELATED APPLICATION

This application is based upon, claims the benefit of priority of, and incorporates by reference the contents of, Japanese Patent Application No. 2003-51075 filed on Feb. 27, 2003.

FIELD OF THE INVENTION

The present invention relates to an electronic control unit for controlling an actuator with a microcomputer.

BACKGROUND OF THE INVENTION

JP-UM-A-5-36544 (Patent Document 1; page 2, FIG. 1) discloses a microcomputer control device comprising a microcomputer for outputting a control signal to control a predetermined load, a watchdog circuit for detecting an abnormal operation state of the microcomputer and outputting a reset signal to reset the microcomputer, a fail safe circuit for outputting a fail safe signal in response to the reset signal of the watchdog circuit, and a signal switching circuit for switching the control signal of the microcomputer to the fail safe side in response to the fail safe signal.

However, this microcomputer control device disclosed in the Patent Document 1 is insufficient for systems such as ABS, VSC, etc., because merely monitoring a watchdog pulse is not enough. Higher-level monitoring (in which a command is accurately executed, etc.) is needed.

Using two microcomputers for executing a function check while carrying out mutual data communication therebetween and comparing the check results does not effectively solve this problem because the costs become too high, thereby weakening the competitiveness of the final products.

SUMMARY OF THE INVENTION

The present invention has an object to provide a low-price electronic control unit which can surely monitor whether a microcomputer operates normally.

In order to attain the above object, according to a first aspect, a monitoring circuit is equipped with a communicating unit and a comparing/judging unit. The communicating unit transmits an assignment number to a microcomputer and receives an answer from the microcomputer. The comparing/judging unit then compares the answer received from the microcomputer with a correct answer to check the function of the microcomputer.

The microcomputer controls an actuator, and also carries out a predetermined self-function check operation in accordance with the assignment number received and transmits the operation result as an answer to the monitoring circuit.

The electronic control unit is designed so that the microcomputer carries out the self-function check operation in accordance with the assignment number received, and the monitoring circuit checks the answer as the operation result thereof. Therefore, it can be surely monitored whether the microcomputer operates normally. Furthermore, only one microcomputer is used, and thus the cost is low.

According to a second aspect, a monitoring circuit is equipped with an assignment number selecting unit, a communicating unit and a comparing/judging unit. The assignment number selecting unit of the monitoring circuit selects an assignment number to be transmitted to a microcomputer. The communicating unit of the monitoring circuit transmits the assignment number selected by the assignment number selecting unit to the microcomputer, and receives an answer from the microcomputer.

The comparing/judging unit of the monitoring circuit compares the answer thus received with a correct answer. When the answer matches the correct answer, the comparing/judging unit renews the assignment number to be selected by the assignment number selecting unit, transmits the renewed assignment number as a next assignment number to the microcomputer, and then compares a received answer with a correct answer.

On the other hand, when the answer does not match the correct answer, the comparing/judging unit of the monitoring circuit does not renew the assignment number to be selected by the assignment number selecting unit and selects the previously-transmitted assignment number again. The communicating unit transmits the assignment number concerned to the microcomputer, and then the comparing/judging unit compares a received answer with a correct answer.

The microcomputer controls an actuator, and also carries out a predetermined self-function check and transmits the operation result as an answer to the monitoring circuit.

An electronic control unit is designed so that the microcomputer carries out the self-function check operation in accordance with the assignment number received and the comparing/judging unit of the monitoring circuit checks the answer as the operation result. Therefore, it can be monitored with high precision whether the microcomputer operates normally.

When the received answer and the correct answer are not coincident with each other, the same assignment number is kept, this assignment number is transmitted to the microcomputer again, and the received answer and the correct answer are compared with each other. Accordingly, under the same condition (the same assignment number), the function of the microcomputer can be checked. In addition, only one microcomputer is used, and thus the cost is low.

According to a third aspect, if something causes the microcomputer to fall into an abnormal state, it is prohibited from transmitting an answer so that a wrong answer will not be transmitted.

Therefore, when the monitoring circuit cannot receive any answer within a predetermined time from the time when an assignment number is transmitted to the microcomputer, or when non-coincidence between the received answer and the correct answer occurs a predetermined number of times, the monitoring circuit judges that the microcomputer is in an abnormal state.

Accordingly, overflow or a stop in operation of the microcomputer can be surely detected, while a temporary and rare operational error such as a soft error caused by α-ray (temporary garbled bits of RAM) or the like, which is only a temporary error of the microcomputer, is not detected as abnormality, so that the trouble of the computer can be surely detected.

According to a fourth aspect, the microcomputer transmits the answer of an intentionally wrong operation result every predetermined number of communications to the monitoring circuit to thereby check the function of the monitoring circuit. Accordingly, it can be checked by the microcomputer whether the monitoring circuit operates normally.

According to a fifth aspect, when it is judged that the microcomputer is in an abnormal state, the monitoring circuit prohibits the actuator from driving the microcomputer and notes the occurrence of abnormality. Accordingly, the electronic control unit can be applied to a system associated with safety such as ABS, VSC or the like.

According to a sixth, tenth and fourteenth aspects, the monitoring circuit has means of judging whether the microcomputer is returned to a normal state after having judged the microcomputer as being in an abnormal state.

Accordingly, as described in a tenth aspect, when power is turned on, the microcomputer is put into an abnormal state, so that the normal control processing is executed after the microcomputer is surely judged in the normal state. Therefore, an electronic control unit having higher safety can be provided.

According to a fourteenth aspect, after reset is started, the computer transmits an answer containing an intentionally wrong operation result with respect to an assignment number at least once to check whether the monitoring circuit can make an accurate judgment of abnormality of the microcomputer and surely execute the processing for abnormality (switching the control system to the safety side). Therefore, a safer electronic control unit can be provided.

According to a seventh aspect, as the means of judging whether the microcomputer is restored to the normal state, a predetermined number of times of sequential coincidences between the answer and the correct answer is used. Therefore, the abnormality processing mode can be released on the confirmation that the microcomputer is surely restored to the normal state. Therefore, an electronic control unit having higher safety can be provided.

According to an eighth aspect, as the means of judging the restoration of the microcomputer to the normal state, receiving a normal restoration signal is used. Accordingly, the abnormality processing mode can be released earlier, so that the operation check time of the monitoring circuit can be shortened.

According to a ninth aspect, when the microcomputer is in such an unstable state that it alternately repeats the abnormal state and the normal state, it is estimated that an abnormality has occurred in the microcomputer. Further, the frequency at which the monitor circuit can judge that the microcomputer is restored to the normal state is restricted to a predetermined number. Therefore, when the microcomputer suffers an abnormality, the abnormality can be surely judged.

According to an eleventh aspect, when judging that the microcomputer is restored to the normal state, the monitoring circuit allows the microcomputer to drive the actuator and ceases to note the function abnormality. Therefore, when the microcomputer is restored to the normal state, the normal electronic control can be restored.

According to a twelfth aspect, when the microcomputer is judged to be in an abnormal state, the monitoring circuit resets the microcomputer and then re-starts the microcomputer to initialize the microcomputer. Therefore, the microcomputer can be restored from a temporary abnormality such as an overflow caused by noises or the like, and thus this invention can be preferably applied to a system for which interruption of control is unfavorable.

However, in the case of such permanent abnormality that abnormality occurs again even when the microcomputer is reset and initialized, it is necessary to surely stop the system. Therefore, according to a thirteenth aspect, the frequency at which the microcomputer is reset and restarted by the monitoring circuit is restricted, and when the reset/restart frequency exceeds the above frequency, the microcomputer is fixedly reset to be kept in the initial state.

At this time, the monitoring circuit also prohibits the microcomputer from controlling the actuator, evacuates the actuator to the safety side and notes the abnormality, so that an electronic control unit having higher safety can be provided.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Preferred embodiments according to the present invention will be described hereunder with reference to the accompanying drawings.

First Embodiment

An electronic control unit 100 for ABS control according to an embodiment of the present invention will be described with reference to FIGS. 1 to 3. The electronic control unit 100 is equipped with a microcomputer 1 for controlling a hydraulic cylinder (not shown) on the basis of sensor outputs from four vehicle speed sensors (not shown), and a monitoring circuit 2 for monitoring the function of the microcomputer 1.

Figure 2:
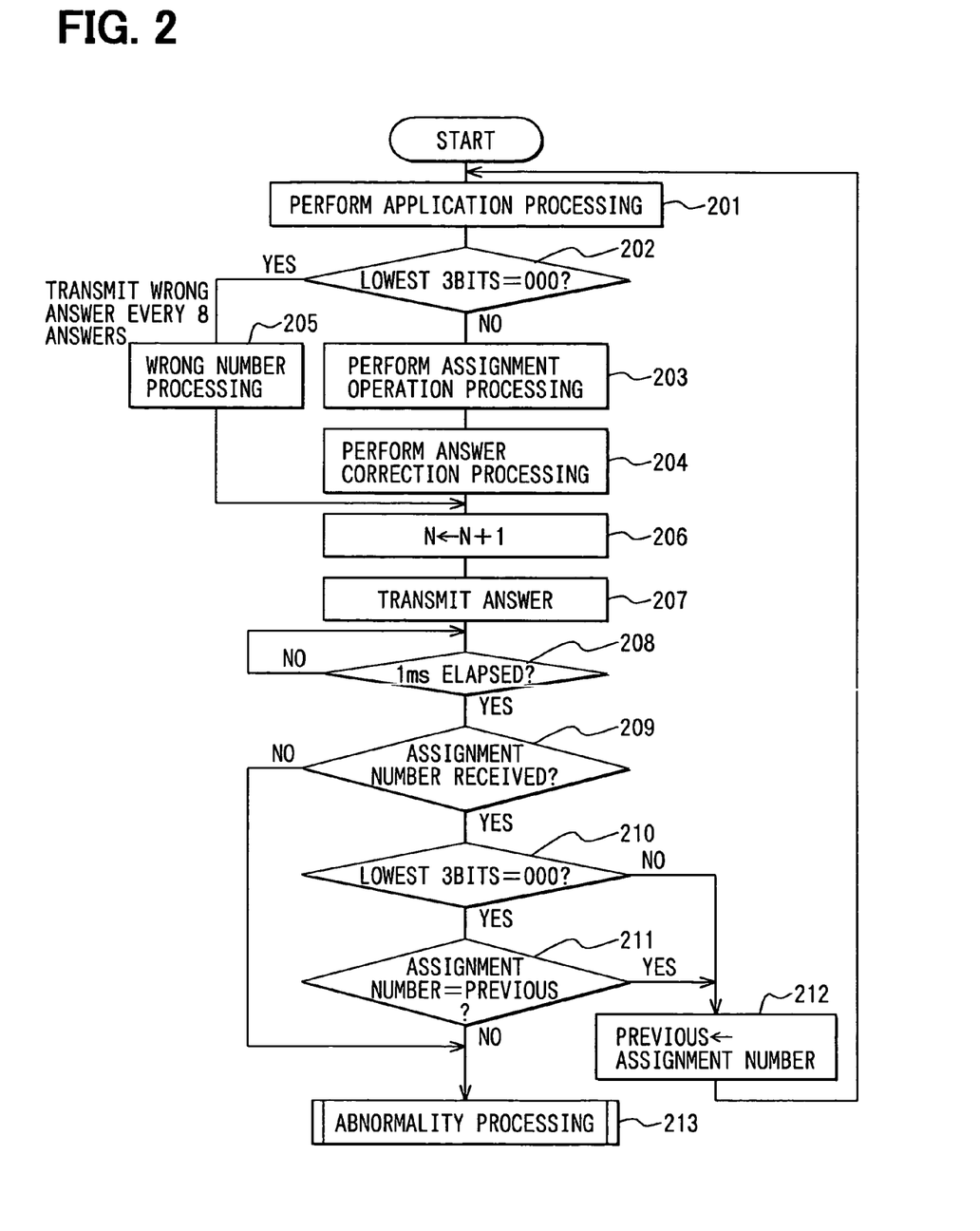
FIG. 2 is a flow diagram of the methodology executed by a microcomputer equipped to each of the electronic control devices.
Figure 3:
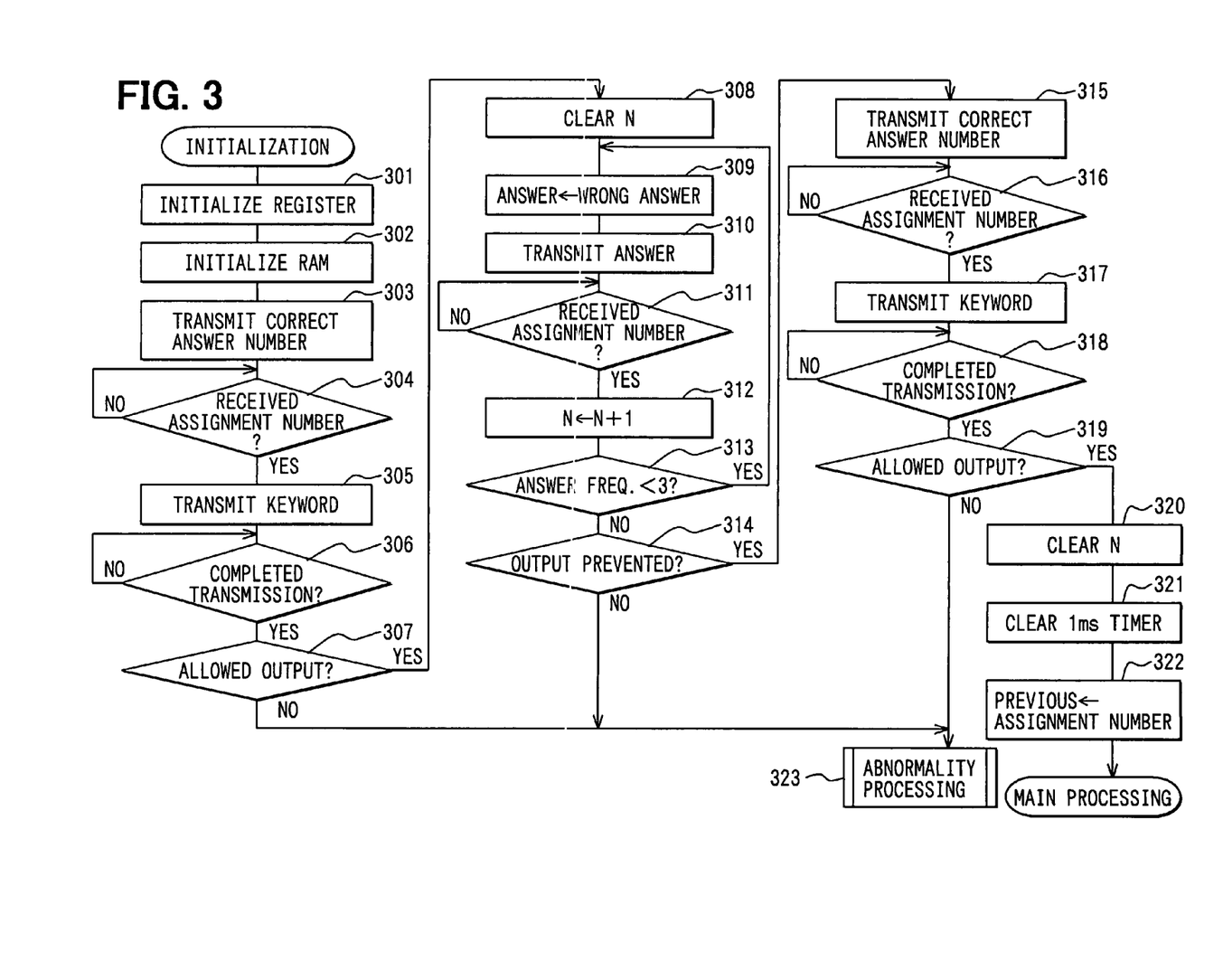
FIG. 3 is a flow diagram of the methodology executed by the microcomputer for initializing the electronic control unit.

The microcomputer is operated on the basis of the flow diagram (steps 201 to 212) of FIG. 2. More particularly, the microcomputer 1 carries out predetermined assignment operation processing (step 203) to check the function of the microcomputer 1 itself in accordance with a received assignment number 21, and carries out answer correction processing (step 204) in accordance with the operation result to calculate an answer number 11. The received assignment number 21 is imposed on an input signal 20. Thereafter, the microcomputer 1 transmits the answer number 11 thus calculated to the monitoring circuit 2. The answer number 11 is imposed on an answer signal 10.

In this case, the microcomputer 1 intentionally transmits an answer signal 10 containing a wrong answer number 11 to the monitoring circuit 2 every eight times (in step 202, lower three bits of M are "000"). The microcomputer 1 carries out a wrong answer judgment check for checking whether an assignment signal 20 having the same assignment number 21 as was just previously transmitted is transmitted (in step 211, the present assignment number is identical to the preceding assignment number), thereby checking the operation of the monitoring circuit.

When a power supply source for actuating the electrical control unit 100 is turned on (initialization time), the microcomputer 1 intentionally transmits the answer signal 10 containing the wrong answer number 11 (step 309) to the monitoring circuit three times sequentially to put the control of the hydraulic cylinder into an inhibition state (the drive prevention state), thereby checking the operation of the monitoring circuit 2 (YES in step 314). Thereafter, an drive prevention release key is transmitted to the monitor circuit 2.

When an drive prevention release Key check circuit 71 confirms the drive prevention release key, the drive prevention releasing circuit 7 releases the drive prevention state of the hydraulic cylinder (the release is carried out up to three times).

Figure 1:
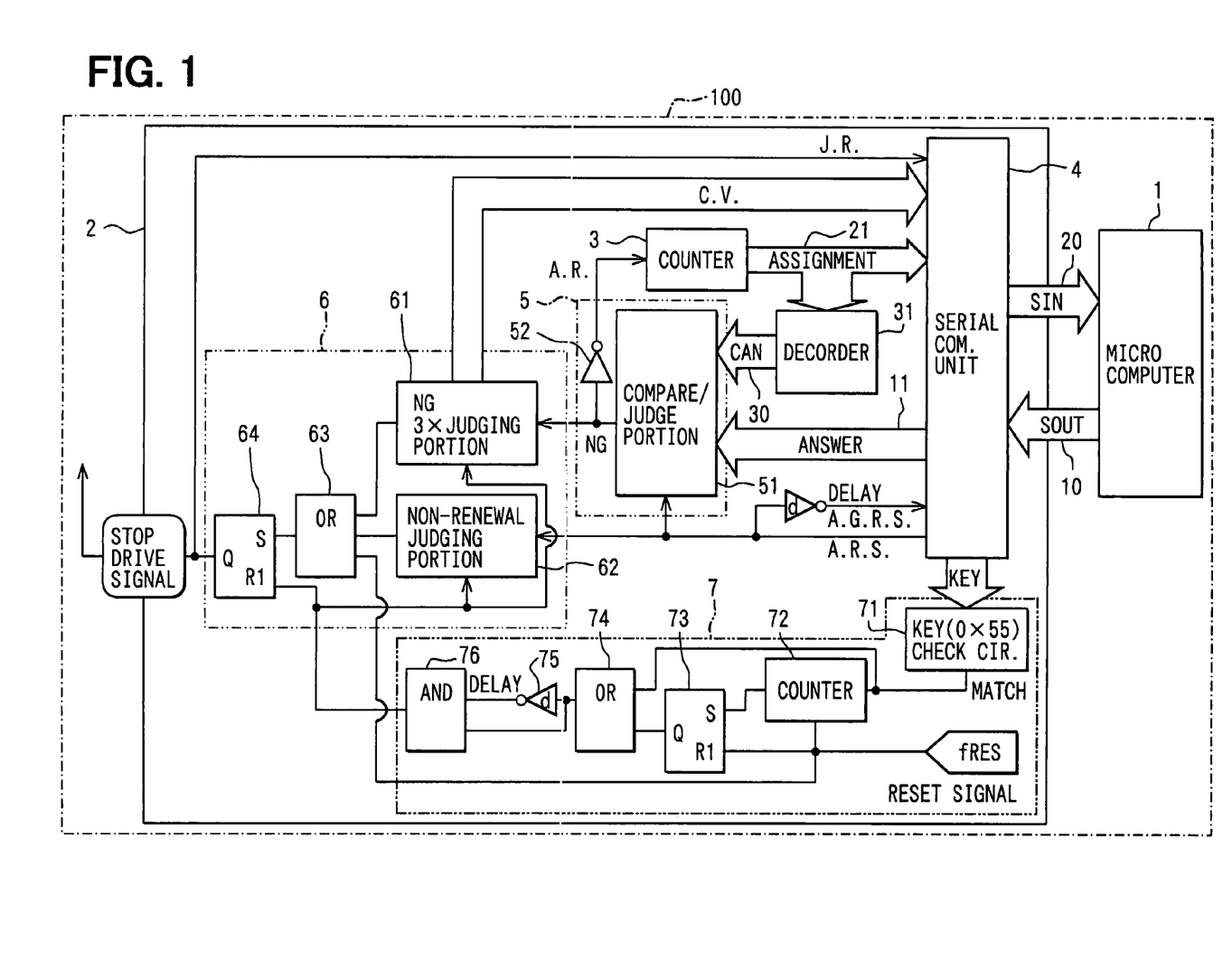
FIG. 1 is a block diagram of an electronic control unit for ABS control according to a first preferred embodiment.

Referring to FIG. 1, the monitoring circuit 2 comprises a counter 3 (assignment number selecting unit), a serial communicating unit 4 (communicating unit), a comparing/judging circuit 5 (comparing/judging unit), a drive prevention unit 6 and a drive prevention releasing circuit 7.

The counter 3 serves to create an assignment signal containing a predetermined assignment number 21 of preferably 8 bits. The assignment signal (or assignment number) 21 output from the counter 3 is input to a decoder 31 for outputting a correct answer number 30 (correct answer number represented by C.A.N. in FIG. 1) and is also input to the serial communicating unit 4.

Every predetermined time, the serial communicating unit 4, which makes serial communications with the microcomputer 1 transmits the assignment signal 20 (SIN), receives an answer signal 10 (SOUT) from the microcomputer 1 and inputs an 8-bit answer number 11 (the answer contained in an answer signal represented as A.N. in FIG. 1) into a comparing/judging portion 51 of the comparing/judging circuit 5.

The comparing/judging circuit 5 has the comparing/judging portion 51 and an inverter circuit 52. The comparing/judging portion 51 compares the answer number 11 with the correct answer number 30 output from the decoder 31. If both the answer number 11 and the correct answer number 30 are coincident with each other (answer number 11=correct answer number 30), the comparing/judging portion 51 outputs an assignment renewing signal (represented by A.R. in FIG. 1) through the inverter circuit 52 to the counter 3 to increment the assignment number 21 of the assignment signal to be transmitted from the counter 3 by one.

If the answer number 11 and the correct answer number 30 are not coincident with each other (NG: answer number 11≠correct answer number 30), no assignment renewing signal is output through the inverter circuit 52 to the counter 3, and thus the assignment signal 21 containing the same assignment number as the preceding assignment number which was just previously transmitted is output from the counter 3.

The drive prevention unit 6 comprises a three time (3×) NG judging portion 61, a non-renewal judging portion 62, an OR circuit 63 and a flip-flop circuit 64.

The three time NG judging portion 61 judges whether the frequency at which NG is sequentially judged by the comparing/judging portion 51 reaches three or more. If the continuous NG judgment frequency reaches three, the three time NG judging portion 61 transmits a Hi-level output.

The non-renewal judging portion 62 judges on the basis of the answer number renewing signal from the serial communicating unit 4 whether the answer number is renewed within a predetermined time (30 ms). If the answer number is not renewed, the non-renewal judging portion 62 transmits a Hi-level output.

If the OR circuit 63 receives a Hi-level output from the three time NG judging portion 61, the non-renewal judging portion 62 or a CPU reset signal, the OR circuit 63 judges that the microcomputer 1 falls into the abnormal operation state, and transmits a Hi-level output to the flip-flop circuit 64. In this case, the flip-flop circuit 64 prevents control of the hydraulic cylinder by the microcomputer 1 (i.e., the drive-prevention state).

When the microcomputer 1 falls into the abnormal operation state, a reset signal transmitting circuit (not shown) of the monitoring circuit 2 outputs a reset signal to the microcomputer 1. When the microcomputer 1 is restored to the normal state on the basis of the reset signal, the microcomputer 1 intentionally transmits in response to the assignment signal 20, the answer signal 10 containing a wrong operation result to the monitoring circuit 2 to check the function of the monitoring circuit 2. In other words, here the microcomputer 1 checks if the monitoring circuit 2 is functioning properly.

The drive prevention releasing circuit 7 comprises a drive prevention release Key check circuit 71, a counter circuit 72, a flip-flop circuit 73, an OR circuit 74, an inverter circuit 75 and an AND circuit 76.

When a releasing key is transmitted from the microcomputer 1 through the serial communicating unit 4, the drive prevention release Key check circuit 71 judges whether the release key is coincident with the drive prevention release key.

In the case where the flip-flop circuit 64 sets the actuator (hydraulic cylinder) to the drive-prevention state, when the drive prevention release Key check circuit 71 confirms the drive prevention release key, the drive prevention release circuit 7 releases the drive-prevention state of the hydraulic cylinder up to three times.

Second Embodiment

Figure 4:
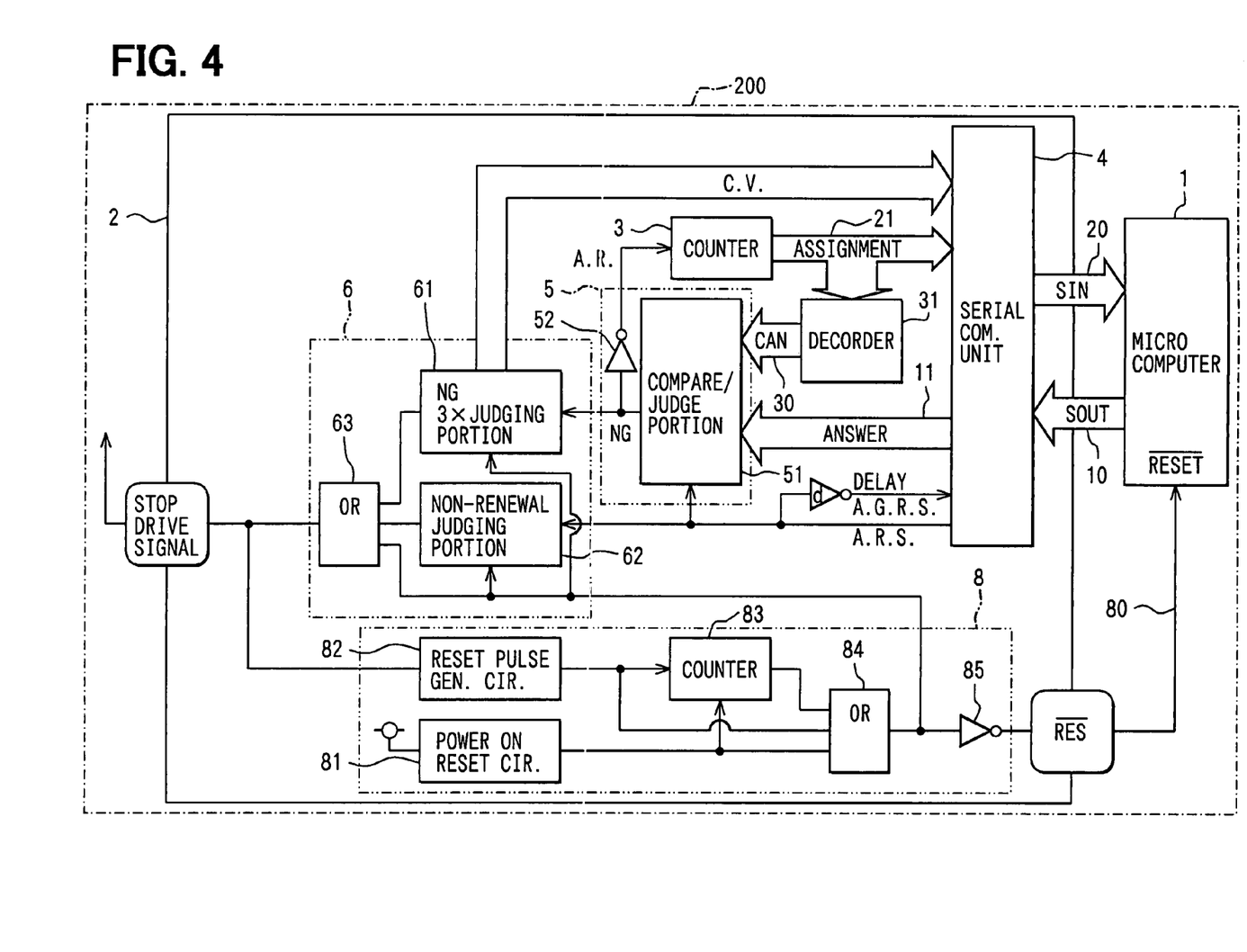
FIG. 4 is a block diagram of an electrical control unit according to a second preferred embodiment.

Next, the operation of the electrical control unit 200 for ABS control (corresponding to first to fifth and twelfth to fourteenth aspects) according to a second preferred embodiment will be described with reference to FIG. 4.

Like the electrical control unit 100, the electrical control unit 200 comprises a microcomputer 1 for controlling a hydraulic cylinder (not shown) on the basis of the sensor outputs of four vehicle speed sensors (not shown), and a monitoring circuit 2 for monitoring the function of the microcomputer 1.

The electrical control unit 200 is equipped with a reset circuit 8 in place of the drive prevention release circuit 7 in the first embodiment. The reset circuit 8 comprises a power ON reset circuit 81, a reset pulse generating circuit 82, a counter 83, an OR circuit 84 and an inverter circuit 85. When the microcomputer 1 is judged to be in an abnormal state, the reset circuit 8 outputs a reset signal to a signal line connected to a reset terminal to reset the microcomputer 1.

The microcomputer normally operates according to the flow diagram (steps 201 to 212) of FIG. 2. This operation is the same as the electrical control unit 100.

Figure 5:
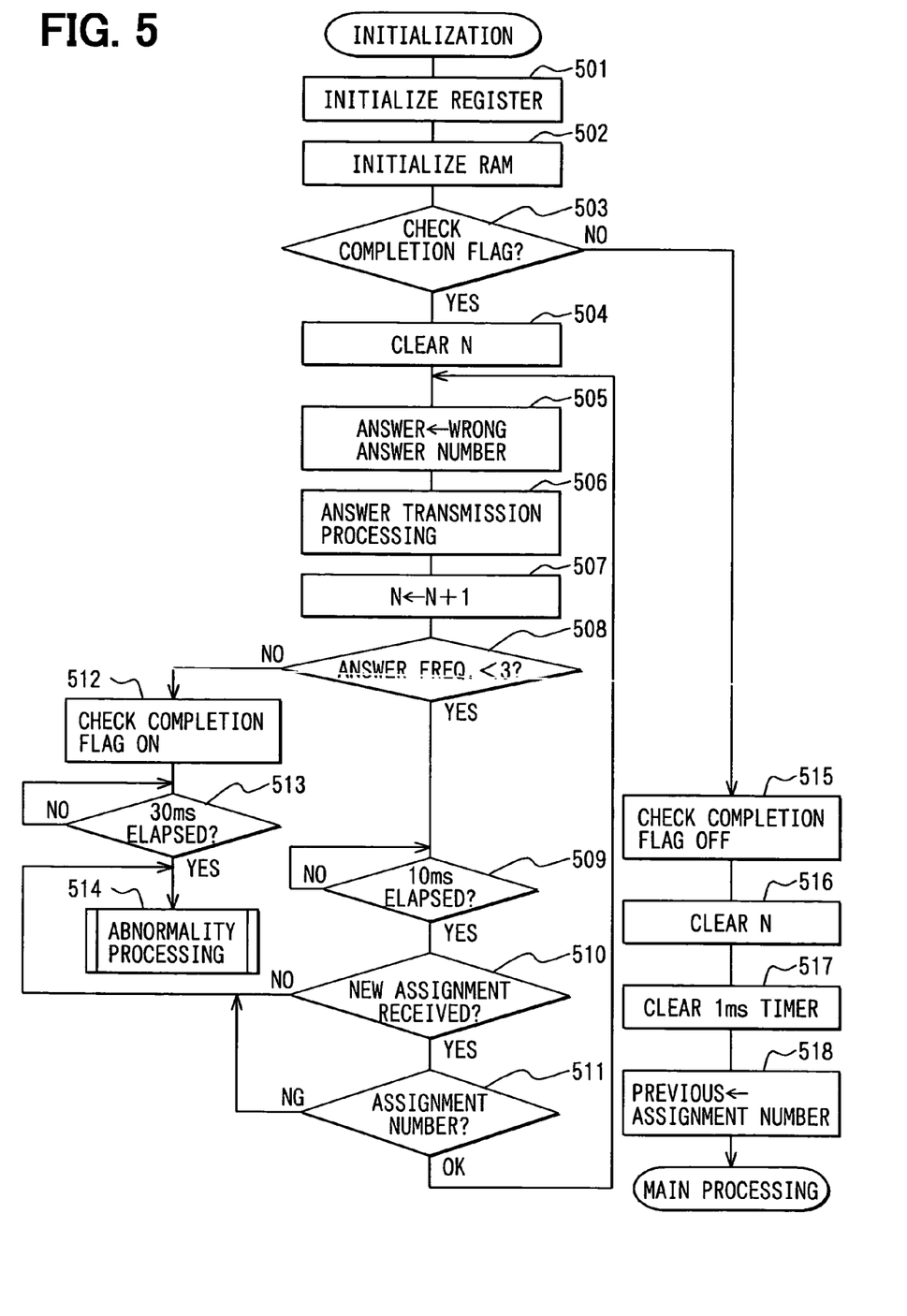
FIG. 5 is a flow diagram of the methodology executed by the microcomputer for initializing the electronic control unit.

When a power supply source for actuating the electrical control unit 200 is turned on (initialization), the microcomputer 1 intentionally transmits an answer signal 10 containing a wrong answer number to the monitoring circuit three times sequentially as shown in the flowchart (steps 501 to 518) of FIG. 5 to make the microcomputer 1 itself reset and thus to check the operation of the monitoring circuit (ON in step 503).

Some of the many advantages provided by electronic control units 100 and 200 will be discussed below.

(A) The electronic control unit 100, 200 is designed so that the comparing/judging circuit 5 of the monitoring circuit 2 compares the answer number 11 with the correct answer number 30 to check the function of the microcomputer 1. Therefore, it can be monitored with high precision whether the microcomputer 1 operates normally. Furthermore, only one microcomputer is used, and thus the cost is low.

When the answer number 11 and the correct answer number 30 are not coincident with each other, the monitoring circuit keeps the assignment number 21 unchanged, again transmits the assignment signal 20 corresponding to the assignment number 21 to the microcomputer 1, and compares the answer number 11 with the correct answer number 30 again. That is, when the answer is wrong, the re-check is carried out under the same condition (by using the same assignment number), and thus it can be surely identified whether the wrong answer is caused by noises or the like or by malfunction of the microcomputer 1.

(B) When the microcomputer 1 falls into an abnormal state by some cause, it becomes impossible to transmit the answer number 11 or both the answer number 11 and the correct answer number 30 are not coincident with each other.

According to the electrical control unit 100, 200, when the answer number is not renewed within 30 ms from the time when the assignment signal 20 is transmitted to the microcomputer 1 or when non-coincidence between the answer number 11 and the correct answer number 30 is judged three times sequentially, it is judged that the microcomputer 1 is in an abnormal state, and thus the control of the hydraulic cylinder by the microcomputer 1 is prevented.

Furthermore, when the power supply source is turned on, the state of the monitoring circuit 2 is set to the microcomputer-abnormality judged state by the reset signal, and the control of the hydraulic cylinder by the microcomputer 1 is prevented by the monitoring circuit 2. That is, the microcomputer is placed in a drive-prevention state. Thereafter, when the microcomputer 1 starts its operation by the release of the reset signal and a normal restoration signal is transmitted to the monitoring circuit 2 through the initialization processing of the microcomputer 1, the monitoring circuit allows the microcomputer 1 to control the hydraulic cylinder. That is, the microcomputer 1 is returned to an actuator-driving state.

According to the electrical control unit 100, 200, when the answer number 11 is not renewed within 30 ms from the time when the assignment signal 20 is transmitted to the microcomputer 1 or when non-coincidence between the answer number 11 and the correct answer number 30 is judged three times sequentially, the monitoring circuit 2 prevents the microcomputer 1 from controlling the hydraulic cylinder. At the same time, the monitoring circuit 2 outputs a reset signal to the microcomputer 1, and after the reset is released the monitor circuit 2 allows the microcomputer 1 to control the hydraulic cylinder, and restores the microcomputer having being in an abnormal state to a normal state.

Accordingly, the electronic control units 100 and 200 can control the hydraulic cylinder for ABS with safety.

If the microcomputer falls into the abnormal state many times, the abnormal state of the microcomputer is probably induced by some cause. Therefore, the frequency at which the control-prevented state of the hydraulic cylinder by the microcomputer is changed to the control-allowed state by the monitoring circuit 2 is limited to three times in the electrical control unit 100.

Furthermore, in the electrical control unit 200, the frequency of resetting the microcomputer by the monitoring circuit 2 is limited to four times by the counter 83.

(C) The electronic control units 100 and 200 are designed so that the microcomputer 1 intentionally transmits the answer signal 10 of the wrong answer number 11 to the monitoring circuit 2 only every eight times of communication between the microcomputer 1 and the monitoring circuit 2. Therefore, it can be properly checked by the microcomputer 1 whether the monitoring circuit 2 normally operates.

(D) In the electronic control units 100 and 200, when the microcomputer 1 is restored to the normal state by the reset signal, the microcomputer 1 intentionally transmits the answer signal 10 containing the wrong operation result in response to the assignment signal 20 in order to check the function of the monitoring circuit 20.

Accordingly, when the microcomputer is set, the function of the monitoring circuit 2 can be checked, and thus safety can be enhanced.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electronic control unit for controlling an actuator with a microcomputer, comprising:
 a monitoring circuit including a communicating unit for transmitting an assignment number to the microcomputer and receiving an answer from the microcomputer, and a comparing/judging unit for comparing the answer with a correct answer for checking the microcomputer,
 wherein the microcomputer performs a predetermined self-function check operation in accordance with the assignment number, and transmits an operation result thereof as an answer,
 wherein the microcomputer intentionally transmits to the monitoring circuit an answer containing a wrong operation result at a predetermined frequency to thereby check the function of the monitoring circuit.

2. An electronic control unit for controlling an actuator with a microcomputer, comprising:
 a monitoring circuit including a communicating unit for transmitting an assignment number to the microcomputer and receiving an answer from the microcomputer, and a comparing/judging unit for comparing the answer with a correct answer for checking the microcomputer,
 wherein the microcomputer performs a predetermined self-function check operation in accordance with the assignment number, and transmits an operation result thereof as an answer,
 wherein the monitoring circuit includes a circuit for judging whether the microcomputer is restored to a normal state after having once judged that the microcomputer is in an abnormal state.

3. The electrical control unit according to claim 2, wherein the circuit judges whether there is a coincidence between the answer and the correct answer sequentially for a predetermined number of times.

4. The electrical control unit according to claim 2, wherein when a normal restoration signal is received, the means to judge whether the microcomputer is restored to the normal state judges that the microcomputer is restored to the normal state.

5. The electrical control unit according to claim 2, wherein the monitoring circuit limits the frequency at which the microcomputer can be judged to be restored to the normal state to a predetermined frequency.

6. The electrical control unit according to claim 2, wherein the monitoring circuit puts the microcomputer into an abnormal state when a power supply source is turned on.

7. The electrical control unit according to claim 2, wherein the monitoring circuit allows the microcomputer to be in an actuator-driving state and ceases to note the function abnormality when the monitoring circuit judges the microcomputer to be restored to the normal state.

8. An electronic control unit for controlling an actuator with a microcomputer, comprising:
   a monitoring circuit including a communicating unit for transmitting an assignment number to the microcomputer and receiving an answer from the microcomputer, and a comparing/judging unit for comparing the answer with a correct answer for checking the microcomputer,
   wherein the microcomputer performs a predetermined self-function check operation in accordance with the assignment number, and transmits an operation result thereof as an answer,
   wherein when the monitoring circuit judges the microcomputer to be in an abnormal state, the monitoring circuit resets the microcomputer to restart the microcomputer.

9. The electrical control unit according to claim 8, wherein the monitoring circuit limits the frequency at which the microcomputer is reset to be restarted to a predetermined number of times, and fixedly resets the microcomputer when the reset/restart frequency of the microcomputer exceeds the predetermined number of times.

10. The electrical control unit according to claim 8, wherein after the microcomputer is reset and restarted, the microcomputer intentionally transmits an answer of a wrong operation result in response to the assignment number at least once to check whether the monitoring circuit makes an accurate judgment on abnormality of the microcomputer and surely executes abnormality processing.

11. An electronic control unit for controlling an actuator with a microcomputer, comprising:
    a monitoring circuit including an assignment number selecting unit for selecting an assignment number, a communicating unit for transmitting the assignment number selected by the assignment number selecting unit to the microcomputer and receiving an answer from the microcomputer, and a comparing/judging unit for comparing the answer with a correct answer to check the function of the microcomputer.
    wherein the assignment number selecting unit renews the assignment number to a next assignment number when the answer and the correct answer are judged to be coincident with each other in the comparing/judging unit, and selects the same assignment number as a next assignment number when the answer and the correct answer are judged to be non-coincident with each other in the comparing/judging unit;
    the microcomputer performs a predetermined self-function check operation in accordance with the assignment number received, and transmits an operation result as the answer; and
    the microcomputer intentionally transmits to the monitoring circuit an answer containing a wrong operation result at a predetermined frequency to thereby check the function of the monitoring circuit.

12. An electronic control unit for controlling an actuator with a microcomputer, comprising:
    a monitoring circuit including an assignment number selecting unit for selecting an assignment number, a communicating unit for transmitting the assignment number selected by the assignment number selecting unit to the microcomputer and receiving an answer from the microcomputer, and a comparing/judging unit for comparing the answer with a correct answer to check the function of the microcomputer,
    wherein the assignment number selecting unit renews the assignment number to a next assignment number when the answer and the correct answer are judged to be coincident with each other in the comparing/judging unit, and selects the same assignment number as a next assignment number when the answer and the correct answer are judged to be non-coincident with each other in the comparing/judging unit;
    the microcomputer performs a predetermined self-function check operation in accordance with the assignment number received, and transmits an operation result as the answer; and
    the monitoring circuit includes a circuit for judging whether the microcomputer is restored to a normal state after having once judged that the microcomputer is in an abnormal state.

13. The electrical control unit according to claim 12, wherein the circuit judges whether there is a coincidence between the answer and the correct answer sequentially for a predetermined number of times.

14. The electrical control unit according to claim 12, wherein the monitoring circuit limits the frequency at which the microcomputer can be judged to be restored to the normal state to a predetermined frequency.

15. The electrical control unit according to claim 12, wherein the monitoring circuit puts the microcomputer into an abnormal state when a power supply source is turned on.

16. The electrical control unit according to claim 12, wherein the monitoring circuit allows the microcomputer to be in an actuator-driving state and ceases to note the function abnormality when the monitoring circuit judges the microcomputer to be restored to the normal state.

17. An electronic control unit for controlling an actuator with a microcomputer, comprising:
    a monitoring circuit including an assignment number selecting unit for selecting an assignment number, a communicating unit for transmitting the assignment number selected by the assignment number selecting unit to the microcomputer and receiving an answer from the microcomputer, and a comparing/judging unit for comparing the answer with a correct answer to check the function of the microcomputer,
    wherein the assignment number selecting unit renews the assignment number to a next assignment number when the answer and the correct answer are judged to be coincident with each other in the comparing/judging unit, and selects the same assignment number as a next assignment number when the answer and the correct answer are judged to be non-coincident with each other in the comparing/judging unit;
    the microcomputer performs a predetermined self-function check operation in accordance with the assignment number received, and transmits an operation result as the answer; and
    when the monitoring circuit judges the microcomputer to be in an abnormal state, the monitoring circuit resets the microcomputer to restart the microcomputer, wherein the monitoring circuit limits the frequency at which the microcomputer is reset to be restarted to a predetermined number of times, and fixedly resets the microcomputer when the reset/restart frequency of the microcomputer exceeds the predetermined number of times.

18. The electrical control unit according to claim 17, wherein when the monitoring circuit judges the microcomputer to be in an abnormal state, the monitoring circuit places the microcomputer into a drive prevention state, and wherein after the microcomputer is reset and restarted, the microcomputer intentionally transmits an answer of a wrong operation result in response to the assignment number at least once to check whether the monitoring circuit makes an accurate judgment on abnormality of the microcomputer and surely executes abnormality processing.

* * * * *